(12) United States Patent
Lee et al.

(10) Patent No.: US 10,108,841 B2
(45) Date of Patent: Oct. 23, 2018

(54) BIOMETRIC SENSOR WITH DIVERGING OPTICAL ELEMENT

(71) Applicant: Synaptics Incorporated, San Jose, CA (US)

(72) Inventors: Young Seen Lee, Newark, CA (US); Paul Wickboldt, Walnut Creek, CA (US); Robert John Gove, Los Gatos, CA (US); Bob Lee Mackey, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 250 days.

(21) Appl. No.: 15/087,544

(22) Filed: Mar. 31, 2016

(65) Prior Publication Data
US 2017/0286743 A1    Oct. 5, 2017

(51) Int. Cl.
*G06K 9/00* (2006.01)
*G02B 3/00* (2006.01)
*G02B 5/20* (2006.01)
*G02B 27/30* (2006.01)

(52) U.S. Cl.
CPC ....... *G06K 9/00046* (2013.01); *G02B 3/0006* (2013.01); *G02B 5/201* (2013.01); *G02B 27/30* (2013.01); *G06K 9/0002* (2013.01); *G06K 9/0008* (2013.01)

(58) Field of Classification Search
CPC ............. G06K 9/00046; G06K 9/0002; G06K 9/0008; G02B 3/0006; G02B 5/201; G02B 27/30
See application file for complete search history.

(56) References Cited

U.S. PATENT DOCUMENTS

| | | | |
|---|---|---|---|
| 5,446,290 | A | 8/1995 | Fujieda et al. |
| 5,726,443 | A | 3/1998 | Immega et al. |
| 5,991,467 | A | 11/1999 | Kamiko |
| 6,128,399 | A | 10/2000 | Calmel |
| 7,465,914 | B2 | 12/2008 | Eliasson et al. |
| 7,535,468 | B2 | 5/2009 | Uy |

(Continued)

FOREIGN PATENT DOCUMENTS

| | | |
|---|---|---|
| CN | 101814125 A | 8/2010 |
| CN | 101814126 B | 8/2010 |

(Continued)

OTHER PUBLICATIONS

International Search Report and Written Opinion for PCT/US2017/024577 dated May 23, 2017.

(Continued)

*Primary Examiner* — Wesley J Tucker
(74) *Attorney, Agent, or Firm* — Leydig, Voit & Mayer, Ltd.

(57) ABSTRACT

An optical biometric sensor includes an array of light sensing elements, an array of diverging optical elements, and an array of apertures disposed between the array of light sensing elements and the array of diverging optical elements. Light incident on the diverging optical elements within a limited acceptance angle passes through the apertures and towards the light sensing elements and light incident on the diverging optical elements outside of the limited acceptance angle diverges away from the apertures.

23 Claims, 9 Drawing Sheets

(56) References Cited

U.S. PATENT DOCUMENTS

| | | | |
|---|---|---|---|
| 8,204,283 B2 | 6/2012 | Wu | |
| 8,204,284 B2 | 6/2012 | Wu | |
| 8,259,168 B2 | 9/2012 | Wu et al. | |
| 8,391,569 B2 | 3/2013 | Wu | |
| 8,520,912 B2 | 8/2013 | Wu et al. | |
| 8,570,303 B2 | 10/2013 | Chen | |
| 8,649,001 B2 | 2/2014 | Wu et al. | |
| 8,798,337 B2 | 8/2014 | Lei et al. | |
| 8,903,140 B2 | 12/2014 | Wu | |
| 8,917,387 B1 | 12/2014 | Lee et al. | |
| 9,177,190 B1 | 11/2015 | Chou et al. | |
| 9,208,394 B2 | 12/2015 | Di Venuto Dayer et al. | |
| 2003/0090650 A1 | 5/2003 | Fujieda | |
| 2004/0252867 A1 | 12/2004 | Lan et al. | |
| 2005/0166957 A1* | 8/2005 | Imoto | H01G 9/2031 136/263 |
| 2007/0109438 A1* | 5/2007 | Duparre | G02B 3/0012 348/335 |
| 2008/0121442 A1 | 5/2008 | Boer et al. | |
| 2008/0253620 A1 | 10/2008 | Hasimoto | |
| 2010/0172552 A1 | 7/2010 | Wu | |
| 2010/0183200 A1 | 7/2010 | Wu | |
| 2010/0204064 A1 | 8/2010 | Cho | |
| 2010/0208952 A1 | 8/2010 | Wu | |
| 2010/0208954 A1 | 8/2010 | Wu | |
| 2010/0283756 A1 | 11/2010 | Ku et al. | |
| 2012/0076370 A1 | 3/2012 | Lei et al. | |
| 2012/0105614 A1 | 5/2012 | Wu et al. | |
| 2012/0321149 A1 | 12/2012 | Carver et al. | |
| 2012/0328170 A1 | 12/2012 | Wu et al. | |
| 2013/0034274 A1 | 2/2013 | Wu et al. | |
| 2013/0051635 A1 | 2/2013 | Wu et al. | |
| 2013/0119237 A1 | 5/2013 | Raguin et al. | |
| 2013/0169780 A1 | 7/2013 | Wu | |
| 2013/0222282 A1 | 8/2013 | Huang et al. | |
| 2014/0125788 A1 | 5/2014 | Wu | |
| 2014/0218327 A1 | 8/2014 | Shi et al. | |
| 2015/0062088 A1 | 3/2015 | Cho et al. | |
| 2015/0078633 A1 | 3/2015 | Hung | |
| 2015/0331508 A1 | 11/2015 | Nho et al. | |
| 2015/0347812 A1 | 12/2015 | Lin | |
| 2015/0347813 A1 | 12/2015 | Tsen | |
| 2015/0369661 A1 | 12/2015 | Lin | |
| 2015/0371074 A1 | 12/2015 | Lin | |
| 2015/0371075 A1 | 12/2015 | Lin | |
| 2016/0247010 A1 | 8/2016 | Huang et al. | |

FOREIGN PATENT DOCUMENTS

| | | |
|---|---|---|
| CN | 102467660 A | 5/2012 |
| CN | 102682280 A | 9/2012 |
| CN | 202443032 U | 9/2012 |
| CN | 102842026 A | 12/2012 |
| CN | 202632318 U | 12/2012 |
| CN | 102915430 A | 2/2013 |
| CN | 102955936 A | 3/2013 |
| CN | 101814126 A | 4/2013 |
| CN | 102682280 B | 6/2013 |
| CN | 103198289 A | 7/2013 |
| CN | 102467660 B | 11/2013 |
| CN | 103810483 A | 5/2014 |
| CN | 103942537 A | 7/2014 |
| CN | 104035620 A | 9/2014 |
| CN | 104063704 A | 9/2014 |
| CN | 203838722 U | 9/2014 |
| CN | 104182727 A | 12/2014 |
| CN | 204028936 U | 12/2014 |
| CN | 104463074 A | 3/2015 |
| CN | 102915430 B | 8/2015 |
| CN | 102842026 B | 9/2015 |
| CN | 102955936 B | 9/2015 |
| EP | 2437201 A2 | 4/2012 |
| EP | 2437201 A3 | 4/2012 |
| EP | 2447883 A1 | 5/2012 |
| EP | 2555137 A1 | 2/2013 |
| EP | 2562683 A1 | 2/2013 |
| JP | 3177550 U | 8/2012 |
| KR | 20120003165 U | 5/2012 |
| KR | 200462271 Y1 | 9/2012 |
| KR | 20130016023 A | 2/2013 |
| KR | 20130022364 A | 3/2013 |
| KR | 101259310 B1 | 5/2013 |
| KR | 101307002 B1 | 9/2013 |
| TW | 201214303 A1 | 4/2010 |
| TW | 201027436 A1 | 7/2010 |
| TW | 201032145 A1 | 9/2010 |
| TW | 201115479 A1 | 5/2011 |
| TW | M435680 U1 | 2/2012 |
| TW | 201301144 A1 | 1/2013 |
| TW | I382349 B1 | 1/2013 |
| TW | I382350 B1 | 1/2013 |
| TW | I450201 B | 2/2013 |
| TW | 201310353 A1 | 3/2013 |
| TW | 201329872 A1 | 7/2013 |
| TW | 201419165 A | 5/2014 |
| TW | I444904 B | 7/2014 |
| TW | I448973 B | 8/2014 |
| TW | I457842 B | 10/2014 |
| TW | 201441940 A | 11/2014 |
| TW | I456510 B | 12/2014 |
| TW | 201308215 A1 | 2/2015 |
| TW | 201506807 A | 2/2015 |
| WO | WO 2015/041459 A1 | 3/2015 |
| WO | WO 2015/140600 A1 | 9/2015 |

OTHER PUBLICATIONS

Rowe et al. "Multispectral Fingerprint Image Acquisition" Springer, New York, USA, 2008 pp. 3-23.

Vkansee Presentation prior to Sep. 30, 2015.

Cho, et al, "Embedded Nano-Si Optical Sensor in TFT-LCDs Technology and Integrated as Touch-Input Display" *Digest of Technical Papers*. vol. 42. No. 1., 2011, pp. 1818-1821.

Brown, et al., "A Continuous-Grain Silicon-System LCD With Optical Input Function" IEEE Journal of Solid-State Circuits, Dec. 12, 2007, vol. 42.

Atpina Technology White Paper "An Objective Look at FSI and BSI" May 18, 2010, 6 pages.

Durini, "High Performance Silicon Imaging: Fundamentals and Applications of CMOS and CCD Sensors" *Woodhead Publishing Series in Electronic and Optical Materials* 1st edition; May 8, 2014, pp. 98-107.

\* cited by examiner

BIOMETRIC SENSOR WITH DIVERGING OPTICAL ELEMENT

FIELD

The present disclosure generally relates to optical sensors, and more particularly to optical sensors using a diverging optical element.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints, like various other biometric characteristics, are based on distinctive personal characteristics and thus provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require recognition systems that are both small in size and highly reliable.

Most commercially available fingerprint sensors are based on optical or capacitive sensing technologies. Unfortunately, conventional optical fingerprint sensors are too bulky to be packaged in mobile devices and other common consumer electronic devices, confining their use to door access control terminals and similar applications where sensor size is not a restriction.

As a result, fingerprint sensors in most mobile devices are capacitive sensors having a sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each sensing element in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens") that protects the display of many smart phones and other mobile devices. To address this issue, a cutout is often formed in the cover glass in an area beside the display, and a discrete capacitive fingerprint sensor (often integrated with a mechanical button) is placed in the cutout area so that it can detect fingerprints without having to sense through the cover glass. The need for a cutout makes it difficult to form a flush surface on the face of device, detracting from the user experience, and complicating the manufacture. The existence of mechanical buttons also takes up valuable device real estate.

One possible solution for an optical based sensor is to use a pinhole type camera. A pinhole camera includes a thin light blocking layer with a small aperture. Light from an object on one side of the blocking layer passes through the aperture and is projected in an inverted fashion onto a detection surface disposed on the opposite side of the blocking layer. However, pinhole cameras suffer from certain disadvantages. For example, images collected from a pinhole camera arrangement are inverted and thus may require additional processing to be useful. Moreover, the vast amount of light from the object is blocked by the blocking layer and only a small amount of light is transmitted through the aperture. Thus, image quality may be an issue. Moreover, the area of the object imaged varies significantly as the distance between the blocking layer and the object to be imaged varies.

BRIEF SUMMARY

The present disclosure provides optical biometric sensing devices that include a diverging optical element above an aperture (between the object to be imaged and the aperture) for each sensing element or pixel to enhance the effect of the aperture to preferentially remove contributions of light from object features far from the central axis of the sensing element or pixel. Such embodiments advantageously reduce the blurring effect that occurs when the input object moves further from the sensor. In certain embodiments including an optional "collimator filter", this use of a diverging optical element (as opposed to none or a converging element) reduces the height or length of the collimator filter that is needed, which can be an advantage in sensor fabrication, including in-display sensing where a longer or taller filter can impact the display image quality.

According to an embodiment, an optical biometric sensor (e.g., a fingerprint sensor) is provided that typically includes an array of light sensing elements, an array of diverging optical elements, and an array of apertures disposed between the array of light sensing elements and the array of diverging optical elements. In operation, light incident on the diverging optical elements within a limited acceptance angle passes through the apertures and towards the light sensing elements and light incident on the diverging optical elements outside of the limited acceptance angle diverges away from the apertures. In certain aspects, the array of diverging optical elements includes a plurality of lens elements formed of a second material having a second index of refraction, $n_2$, different than a first index of refraction, $n_1$, of a first material from which the light incident on the diverging optical elements enters the diverging optical elements. In certain aspects, the array of diverging optical elements includes a plurality of lens elements each having an index of refraction that gradually increases from a center portion of the lens element to an outer portion of the lens element. In certain aspects, each aperture in the array of apertures has a circular cross section or a rectangular cross section. In certain aspects, the optical biometric sensor further includes an array of collimator filter hole structures, wherein each aperture is disposed proximal to a light entry end of a corresponding collimator filter hole structure, and wherein each collimator filter hole structure extends from the corresponding aperture toward at least one corresponding light sensing element. In certain aspects, the optical biometric sensor further includes an array of collimator filter hole structures, wherein each aperture forms a light entry end of a corresponding collimator filter hole structure, and wherein each collimator filter hole structure extends from the corresponding aperture toward at least one corresponding light sensing element. In certain aspects, the optical biometric sensor further includes an array of collimator filter hole structures, wherein each aperture is disposed proximal to a light exit end of a corresponding collimator filter hole structure, and wherein each collimator filter hole structure extends from the corresponding aperture toward at least one corresponding diverging optical element disposed at a light entry end of the collimator filter hole structure.

According to another embodiment, a method of making an optical biometric sensor (e.g., fingerprint sensor) is provided. The method typically includes forming an array of light sensing elements in a substrate, forming an array of apertures on the substrate, and forming an array of diverging optical elements on the array of apertures, wherein the array of apertures is disposed between the array of light sensing elements and the array of diverging optical elements. The array of diverging optical elements is typically arranged such that light incident on the diverging optical elements within a limited acceptance angle passes through the apertures and towards the light sensing elements and such that light incident on the diverging optical elements outside of the limited acceptance angle diverges away from the apertures.

According to yet another embodiment, An input device for imaging a biometric object (e.g., fingerprint) is provided that typically includes an input surface, an optical image sensor for sensing the biometric object at the input surface, and a display cover lens positioned between the optical image sensor and the input surface. The optical image sensor typically includes an array of light sensing elements, an array of diverging optical elements, and an array of apertures disposed between the array of light sensing elements and the array of diverging optical elements. In operation, light incident on the diverging optical elements from the input surface within a limited acceptance angle passes through the apertures and towards the light sensing elements and wherein light incident on the diverging optical elements from the input surface outside of the limited acceptance angle diverges away from the apertures. In certain aspects, a surface of the display cover lens comprises the input surface. In certain aspects, the input surface comprises a surface of an optically transparent glass or polymer material layer overlaying the display cover lens.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, summary, brief description of the drawings, or the following detailed description.

Turning to the drawings, and as described in greater detail herein, embodiments of the disclosure provide methods and systems to optically image an input object such as a fingerprint. In particular, a method and system is described wherein an optical sensor includes an array of diverging optical elements combined with an array of apertures, or aperture array, which operate as a light conditioning layer, interposed between a light illumination layer and an image sensor array. Transmitted light from the illumination layer reflects from an input object in a sensing region above a cover layer. The reflected light is filtered by the light conditioning layer such that only certain of the reflected light beams reach optical sensing elements in the image sensor array. In particular, a diverging optical element combined with an aperture operates to limit an acceptance angle of light beams that reach an optical light sensor element in the image sensor array. Light beams outside of the preferential acceptance angle diverge or are diverted away from the light sensor element. Employing a diverging optical element with an aperture as disclosed herein advantageously reduces or prevents image blurring. The present disclosure describes the use of diverging optical elements to improve optical sensing, for example optical sensing through a large range of thicknesses of cover layers.

In certain embodiments, the light conditioning layer further includes a light pipe or collimator filter layer interposed between the aperture array and the image sensor array, or between the diverging optical element array and the aperture array. Employing a light pipe or collimator filter layer helps further reduce or prevent blurring while allowing for a lower-profile image sensor, such as a fingerprint sensor, than is possible with purely lens-based or pinhole camera based imaging sensors. Thus, the image sensor can be made thin for use in mobile devices such as cell phones. When used in combination with a light pipe or collimator filter layer, the use of a diverging optical element reduces the height or length of the light pipe that is needed, providing advantages in sensor fabrication and use, including in-display sensing where a longer or taller light pipe might impact the display image quality.

Figure 1:
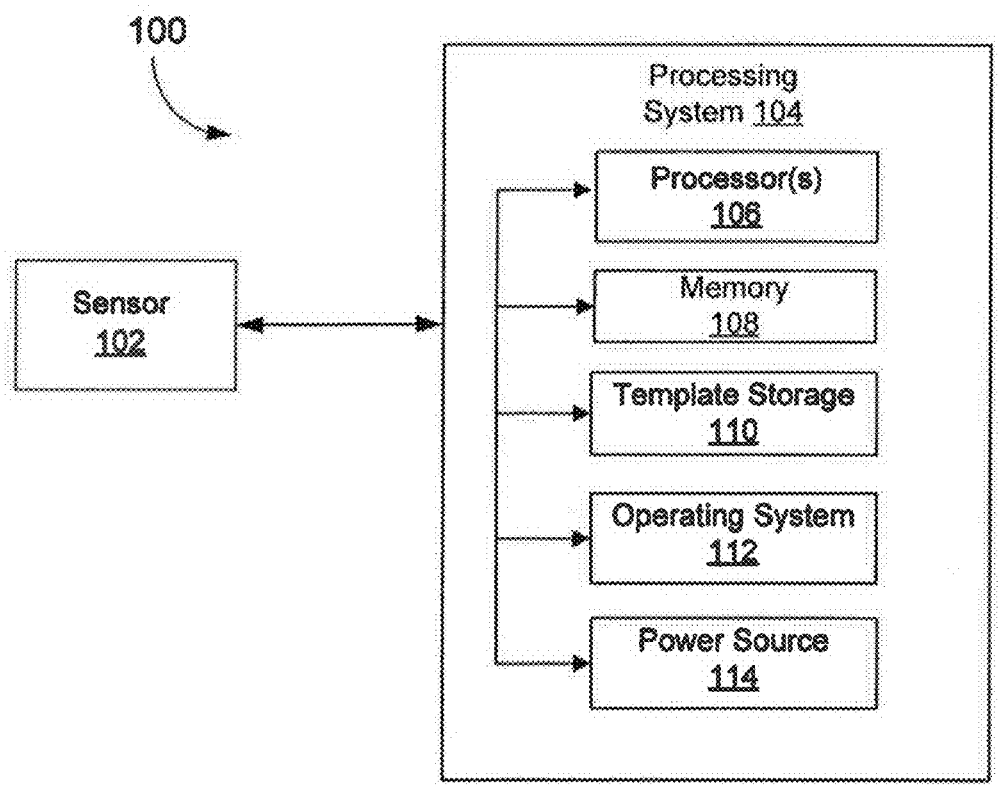
FIG. 1 is a block diagram of an example of a system that includes an optical sensor and a processing system, according to an embodiment of the disclosure.

FIG. 1 is a block diagram of an example of an electronic system 100 that includes an optical sensor device 102 and a processing system 104, according to an embodiment of the disclosure. By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information. More generally, the template storage 110 may be used to store information about an object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well as power cords and/or adapters which are in turn connected to electrical power.

Optical sensor 102 can be implemented as a physical part of the electronic system 100, or can be physically separate from the electronic system 100. As appropriate, the optical sensor 102 may communicate with parts of the electronic system 100 using any one or more of the following: buses, networks, and other wired or wireless interconnections. In some embodiments, optical sensor 102 is implemented as a biometric sensor to capture biometric information of a user input object. For example, in one embodiment, optical sensor 102 is implemented as a fingerprint sensor to capture a fingerprint image of a user. In accordance with the disclosure, the optical sensor 102 uses optical sensing for the purpose of object imaging including imaging biometric objects, or features, such as fingerprints. The optical sensor 102 can be incorporated as part of a display, for example, or may be a discrete sensor.

Some non-limiting examples of electronic systems 100 include personal computers of all sizes and shapes, such as desktop computers, laptop computers, netbook computers, tablets, web browsers, e-book readers, and personal digital assistants (PDAs). Additional example electronic systems 100 include composite input devices, such as physical keyboards and separate joysticks or key switches. Further example electronic systems 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

The optical sensor 102 may provide illumination to the sensing region. Reflections from the sensing region in the illumination wavelength(s) are detected to determine input information corresponding to the input object.

The optical sensor 102 may utilize principles of direct illumination of the input object, which may or may not be in contact with an input surface or sensing surface of the sensing region depending on the configuration. One or more light sources and/or light guiding structures may be used to direct light to the sensing region. When an input object is present, this light is reflected from surfaces of the input object, which reflections can be detected by the optical sensing elements and used to determine information about the input object.

The optical sensor 102 may also utilize principles of internal reflection to detect input objects in contact with a sensing surface. One or more light sources may be used to direct light in a light guiding element at an angle at which it is internally reflected at the input surface or sensing surface of the sensing region, due to different refractive indices at opposing sides of the boundary defined by the sensing surface. Contact of the sensing surface by the input object causes the refractive index to change across this boundary, which alters the internal reflection characteristics at the sensing surface, causing light reflected from the input object to be weaker at portions where it is in contact with the sensing surface. Higher contrast signals can often be achieved if principles of frustrated total internal reflection (FTIR) are used to detect the input object. In such embodiments, the light may be directed to the sensing surface at an angle of incidence at which it is totally internally reflected, except where the input object is in contact with the sensing surface and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale fingerprint features, where the internal reflectivity of the incident light differs depending on whether a fingerprint ridge or valley is in contact with that portion of the sensing surface.

Figure 2:
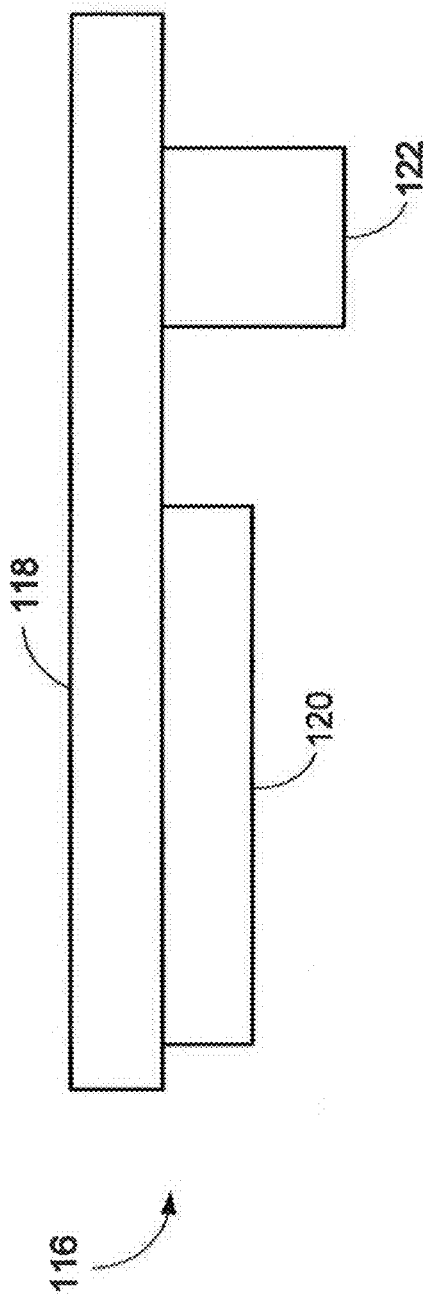
FIG. 2 illustrates an example of a mobile device that includes an optical sensor according to an embodiment of the disclosure.

FIG. 2 illustrates an example of a electronic device 116, such as a mobile phone, which includes cover glass (or cover lens) 118 over a display 120. The disclosed method and system may be implemented by using the display 120 as the optical sensor to image an input object. Alternatively, a separate discrete component 122 provides the optical sensing capabilities. Alternatively, or additionally, a separate discrete component 122 that provides optical sensing capabilities can be located under display 120.

Figure 3:
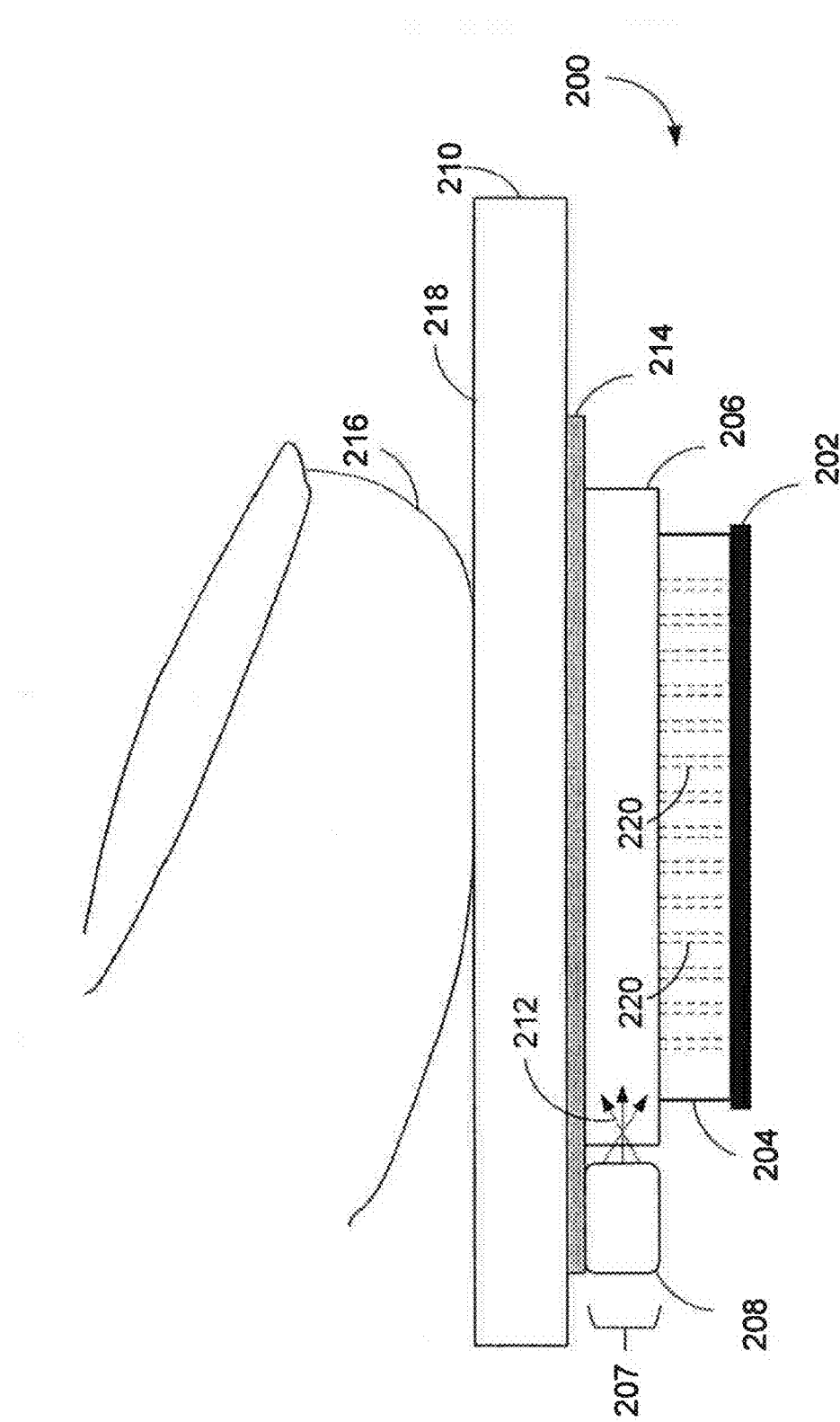
FIG. 3 illustrates an example of an optical sensor with a light conditioning layer according to an embodiment of the disclosure.

FIG. 3 illustrates an example of a stack-up for an optical image sensor device 200 used to image an object 216, such as a fingerprint. The sensor 200 includes an image sensor array 202, light conditioning layer 204 (shown with optional light pipes or collimator filter hole structures 220) disposed above the image sensor array 202, an illumination layer 207 disposed above the light conditioning layer 204, a light source 208, and a cover layer 210. In certain embodiments, a blocking layer 214 may also be provided.

The cover layer 210 protects the inner components of the sensor 200 such as the image sensor array 202. The cover layer 210 may include a cover glass or cover lens that protects inner components of a display in addition to the sensor 200. A sensing region for the input object is defined above the cover layer 210. A top surface 218 of the cover layer 210 may form an input surface or sensing surface, which provides a contact area for the input object 216 (e.g., fingerprint). The cover layer 210 is made of any material such as glass, transparent polymeric materials and the like. In certain embodiments, an additional optically transparent glass or polymer material layer overlays the cover layer 210, in which case the a top surface of the additional layer forms an input surface or sensing surface.

Although generally described in the context of a fingerprint for illustrative purposes, the input object 216 is any object to be imaged. Generally, the object 216 will have various features. By way of example, the object 216 has ridges and valleys. Due to their protruding nature, the ridges contact the sensing surface 218 of the cover 210 layer. In contrast, the valleys do not contact the sensing surface 218 and instead form an air gap between the input object 216 and the sensing surface 218. The object 216 may have other features such as stain, ink and the like that do not create significant structural differences in portions of the input object 216, but which affect its optical properties. The methods and systems disclosed herein are suitable for imaging such structural and non-structural features of the input object 216.

In one embodiment, the illumination layer 207 includes a light source 208 and/or a light guiding element 206 that directs illumination to the sensing region in order to image the input object. As shown in FIG. 3, the light source 208 transmits beams or rays of light 212 into the light guiding element 206 and the transmitted light propagates through the light guiding element 206. The light guiding element may utilize total internal reflection, or may include reflecting surfaces that extract light up towards the sensing region. Some of the light in the illumination layer may become incident at the sensing surface 218 in an area that is contact with the input object 216. The incident light is in turn reflected back towards the light conditioning layer 204. In the example shown, the light source 208 is disposed adjacent to the light guiding element 206. However, it will be understood that the light source 208 may be positioned anywhere within the sensor 200 provided that emitted light reaches the light guiding element 206. For example, the light source 208 may be disposed below the image sensor array 202. Moreover, it will be understood that a separate light guiding element 206 is not required. For example, the light transmitted from the light source 208 can be transmitted directly into the cover layer 210 in which case the cover layer 210 also serves as the light guiding element. As another example, the light transmitted from the light source 208 can be transmitted directly to the sensing region, in which case the light source 208 itself serves as the illumination layer.

A discrete light source is also not required. For example, the method and system contemplate using the light provided by a display, such as light emitting OLED pixels or the backlight from an LCD as suitable light sources. The light provided by the illumination layer 207 to image the object 216 may be in near infrared (NIR) or visible. The light can have a narrow band of wavelengths, a broad band of wavelengths, or operate in several bands.

The image sensor array 202 detects light passing through the light conditioning layer 204. Examples of suitable sensor arrays are complementary metal oxide semiconductor (CMOS) and charge coupled device (CCD) sensor arrays. The sensor array 202 includes a plurality of individual optical sensing elements or light sensing elements capable of detecting the intensity of incident light.

To achieve optical sensing of fingerprints and fingerprint-sized features through thicker cover layers 210, light reflected from the fingerprint is conditioned by the light conditioning layer 204 so that the light reaching a sensing element in the image sensor array 202 comes only from a small spot on the input object 216 directly above the sensor element. In the absence of such conditioning, any light arriving at a sensing element from a region on the object far away from the light sensing elements contributes to image blurring.

To condition the light in accordance with the disclosure, the light conditioning layer 204 is provided with an array of diverging optical elements and an array of apertures, with each aperture being disposed between a diverging optical element and one or more light sensing elements on the image sensor array 202.

The light conditioning layer 204 only allows light rays reflected from the input object 216 (e.g., finger) at normal or near normal incidence to the light conditioning layer 204 to pass and reach the light sensing elements of the image sensor array 204. The light conditioning layer 204 is laminated, stacked, or built directly above the image sensor array 202. By way of example, the light conditioning layer 204 may be made of plastic materials, such as polycarbonate, PET, or polyimide, carbon black, inorganic insulating or metallic materials, silicon, or SU-8. In certain embodiments, the light conditioning layer 204 is monolithic.

Also shown in FIG. 3 is blocking layer 214, which is optionally provided as part of optical sensor 200. The blocking layer 214 is a semitransparent or opaque layer that may be disposed above the light conditioning layer 204. By way of example, the blocking layer may be disposed between the cover layer 210 and the illumination layer 207, as shown in FIG. 3. Alternatively, the blocking layer 214 may be disposed between the illumination layer 207 and the light conditioning layer 204. In either case, the blocking layer 214 obscures components of the sensor 200, such as the apertures in the light conditioning layer 204, from ambient light illumination, while still allowing the sensor 200 to operate. The blocking layer 214 may include of a number of different materials or sub-layers. For example, a thin metal or electron conducting layer may be used where the layer thickness is less than the skin depth of light penetration in the visible spectrum. Alternately, the blocking layer 214 may include a dye and/or pigment or several dyes and/or pigments that absorb light, for example, in the visible spectrum. As yet another alternative, the blocking layer 214 may include several sub-layers or nano-sized features designed to cause interference with certain wavelengths, such as visible light for example, so as to selectively absorb or reflect different wavelengths of light. The light absorption profile of the blocking layer 214 may be formulated to give a particular appearance of color, texture, or reflective quality thereby allowing for particular aesthetic matching or contrasting with the device into which the optical sensor 200 is integrated. If visible illumination wavelengths are used, a semitransparent layer may be used to allow sufficient light to pass through the blocking layer to the sensing region, while still sufficiently obscuring components below.

Figure 4:
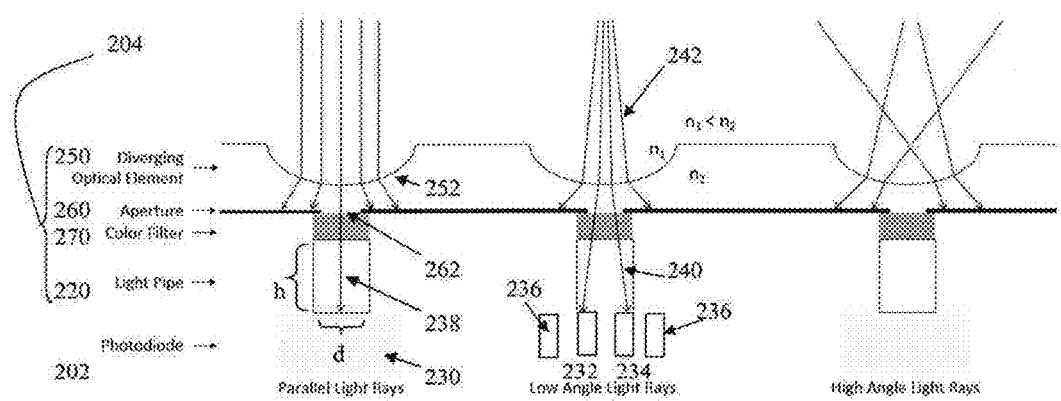
FIG. 4 illustrates an example of a light conditioning layer configuration according to an embodiment of the disclosure.

FIG. 4 illustrates an example of a light conditioning layer 204, including a diverging optical element layer 250 and an aperture array layer 260 according to an embodiment. FIG. 4 also shows interaction of light within the light conditioning layer 204. Image sensor array 202 includes light sensing elements 230 disposed below diverging optical elements 252. Aperture array layer 260 includes an array of apertures or holes 262, each interposed between a diverging optical element 252 and one or more light sensing elements 230.

In one embodiment, each diverging optical element 252 includes a concave lens element (e.g., microlens) that operates such that light incident on the diverging optical element 252 within a limited acceptance angle passes through the aperture 262 and towards the light sensing element(s) 230 and light incident on the diverging optical element 252 outside of the limited acceptance angle diverges away from the aperture 262. In one embodiment, each diverging optical element 252 includes a lens (e.g., microlens) element formed of a material having a index of refraction, n2, different than a index of refraction, n1, of a material from which the light incident on the diverging optical element enters the lens element. For example, in FIG. 4, a microlens element may have a concave profile as shown where n1<n2. Due to Snell's Law, the change in the index of refraction experienced by an incident light beam causes the light beam to refract if not normal to the interface between the two materials. For example, as shown in FIG. 4, for the microlens with a concave profile, a light beam or ray 238 that is incident normal to the interface between the first material (having an index of refraction n1) and a second material (having an index of refraction n2) will pass through unrefracted. Similarly, a light beam or ray 240 that incident at a near normal angle will be refracted slightly. Light beams or rays 242 incident at larger angles will experience a greater refraction, depending on the incident angle. The shape of the microlens interface (e.g., concave profile as shown in FIG. 4 or convex profile as shown in FIG. 5C) can be optimized in combination with the width of the aperture 262 to control the limited acceptance angle within which incident light passes through the aperture 262 and towards the light sensing element(s) 230, and outside of which light incident on the diverging optical element 252 diverges away from the aperture 262. The first material (n1) and the second material (n2) may include optically transparent glass or polymer materials. In one embodiment, the first material includes air (n1=1). In one embodiment, the first material (n1) of the FIG. 4 embodiment may be the material forming the light guiding element 206 or the cover layer 210 (FIG. 3).

Figure 5A:
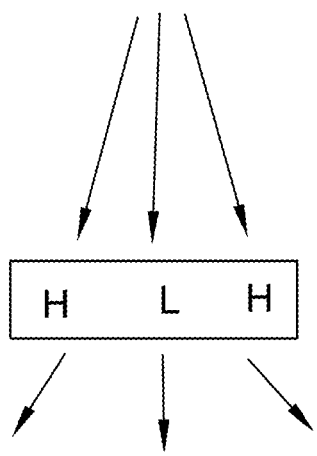
FIGS. 5A-5C illustrate an example of an alternate diverging optical element structures according to an embodiment of the disclosure.
Figure 5B:
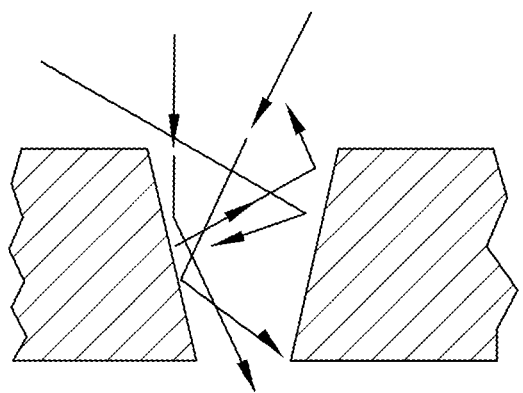
Figure 5C:
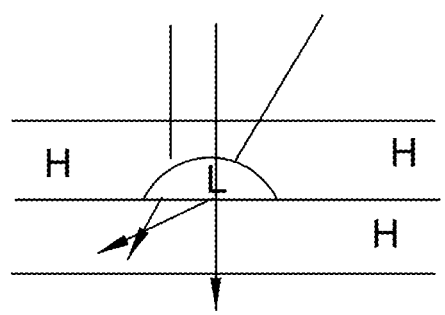

FIGS. 5A-5C illustrate additional embodiments of diverging optical elements. As shown in FIG. 5A, a diverging optical element includes a gradient index lens (GRIN) structure where the element has an index of refraction that gradually increases from a center portion of the element to an outer portion of the element. The GRIN element may have a circular shape or a rectangular or square shape depending on the shape of the aperture and/or collimator filter hole structure with which the diverging optical is combined. In another embodiment, a diverging optical element has a convex profile as shown in FIG. 5C, where n1>n2. In this embodiment, the low index material forms a convex lens, surrounded by material of a higher index of refraction, which functions similar to the concave lens of FIG. 4. It should be appreciated that an array of diverging optical elements 250 may include different types of diverging optical elements 252. For example, the array 250 may include some diverging optical elements configured as shown in FIG. 4, and others configured as shown in FIGS. 5A-5C. FIG. 5B illustrates a tapered reflective tunnel structure that may be used to further reduce the light acceptance angle.

Advantageously, a diverging optical element combined with an aperture acts as a filter to collect only the light from the portion of the input object (e.g., finger) above the corresponding light sensor element or elements at near normal incidence, and limits or filters out higher angle incident light that may contribute to a blurring effect to thereby enable a sharper image of the input object (e.g., fingerprint feature). For example, only light rays from a finger at near normal incidence are collected at the sensor array ensuring that the produced image is much sharper with improved contrast. As can be seen in FIG. 4, the diverging optical element 252 redirects the unwanted rays and prevents them from reaching the light sensing elements.

Figure 6:
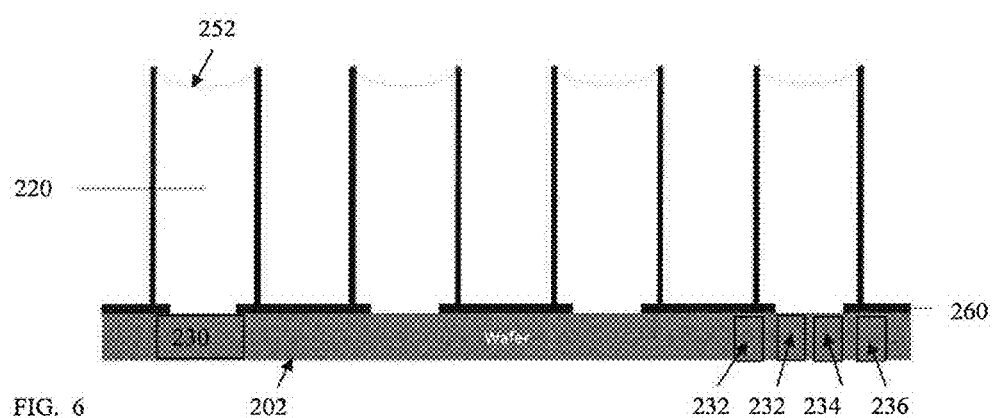
FIG. 6 illustrates an example of an alternate light conditioning layer configuration according to an embodiment of the disclosure.

To further condition the light, in one embodiment, the light conditioning layer 204 is provided with an optional array of collimator filter hole structures or light pipes 220. In one embodiment, each collimator hole structure 220 is disposed above a light sensing element on the image sensor array 202. As shown in FIG. 4, for example, each aperture 262 is disposed proximal to a light entry end of a corresponding collimator filter hole structure 220, and each collimator filter hole structure 220 extends from the corresponding aperture 262 toward at least one corresponding light sensing element 230. In another embodiment, as shown in FIG. 6, each aperture 262 is disposed between the light sensing element 230 and the collimator filter hole structure 220 and proximal to a light exit end of the corresponding collimator filter hole structure 220, and the collimator filter hole structure 220 extends from the corresponding aperture 262 toward the corresponding diverging optical element 252 disposed at a light entry end of the collimator filter hole structure 220.

A collimator filter hole structure 220 may include a physical hole or void in the material layer which may be formed using any suitable technique, such as laser drilling, etching and the like. A collimator filter hole structure may also include a solid transparent glass or polymer material (e.g. pillar) with openings for receiving light on the top and bottom. For example, in the embodiment shown in FIG. 6, each collimator filter hole structure 220 includes an optically clear material, and the light entry end of the optically clear material in the collimator filter hole structure forms the corresponding diverging optical element 252, e.g., the concave profile as shown in FIG. 6. In one embodiment, solid collimator filter hole structures may be made using a double-sided alignment technique to create top and bottom openings that are aligned, but without physically hollow holes through the material (e.g., glass or polymer) body. One of the advantages of this method it that it makes lamination simpler since there are no physically hollow apertures. With a solid (e.g., glass or polymer) collimator filter layer, the cover glass, light guide film, and filter can be laminated, e.g., with readily available lamination equipment, e.g., with polyimide or PET film.

In certain embodiments a color filter layer 270 is further provided in the light conditioning layer 204. The color filter array layer 270 includes individual color filter elements that function to selectively absorb or reflect light of certain wavelengths, or within certain wavelength bands, so that incident light of selected wavelengths, or within selected wavelength bands, is allowed to reach the light sensor elements 230.

Each aperture 262 in the array of apertures may have a circular cross section or a rectangular cross section, or an oval cross section. Apertures 262 in the array of apertures 260 may include mixed cross section profiles, e.g., some apertures in the array may define a circular opening and others may define a rectangular opening.

The collimator filter hole structure 220 deliver the light rays down to the light sensing elements 230 (e.g., photodiodes) and further eliminates unwanted light rays. The collimator filter hole structure 220 functions as a "light guide" and a "collimator filter". A useful metric of the collimator filter hole structure 220 is an aspect ratio of the holes 220. The aspect ratio is the height of the holes (h) divided by hole diameter (d) (or a width in the case of a rectangular cross section). The aspect ratio should be sufficiently large to help prevent stray or undesired light from reaching the optical sensing elements directly under each collimator filter hole structure 220. Larger aspect ratios restrict the light acceptance cone to smaller angles, improving the optical resolution of the system. The minimum aspect ratio can be estimated using a ratio of the distance from the collimator filter layer 220 to the object being imaged (e.g., finger) divided by the desired optical resolution of the finger. In some embodiments, the collimator apertures 220 are cylindrical or conical (e.g., tapered) in shape. The sidewalls of the collimator apertures 220 may include grooves or other structures to prevent stray light from reflecting off the walls and reaching the optical sensing elements. The effective aspect ratio is determined by the average hole diameter along the height of the collimator holes. Examples of suitable aspect ratios are ratios in the range of about 3:1 to 100:1 and more typically in the range of about 5:1 to 20:1.

It is generally desirable to make the height (h) of the collimator apertures 220 as thin as possible to provide the most flexibility for fabricating the collimator filter layer 220 and integrating it with the underlying image sensor array 202, such as a CMOS or CCD image sensor. A small aperture diameter (d) may be used to maintain the desired collimator aspect ratio. However, if the aperture is made too small (less than a few times the wavelength of light being used), diffraction effects can contribute to additional blurring as the light rays exiting the collimator apertures 220 diverge. Such diffraction effects can be mitigated by placing the collimator filter layer 204 as close to the image sensor array 202 as possible, ideally much closer than the Fraunhofer far field distance ($r^2$/lambda, where r is the aperture radius and lambda is the light wavelength).

It is also generally desirable to minimize the distance between the collimator filter layer 220 and the image sensor array 202 to allow the light reaching the light sensing elements of the image sensor array 202 to be as concentrated as possible. In addition, if this sensor array 202 to collimator filter layer 204 distance is too large, stray light from adjacent holes may reach a particular light sensing element, contributing to image blurring. With three elements together—a diverging optical element 252, an aperture 262 and a collimator filter hole structure 220, the total height of the stack advantageously does not have to be increased. When compared to use of a collimator filter hole structure 220 only, a high aspect ratio is advantageously not required if all three elements are combined. For example, the aspect ratio required for a collimator filter hole structure device is greater than about 5:1 (hole depth: hole diameter) to eliminate blurring, which might require deep reactive ion etching (DRIE) through a rather thick Si layer. Combined with the diverging optical element, the aspect ratio requirement can be loosened, and simpler and more cost-effective manufacturing options may be considered. For example, an aspect ratio of a length of each collimator filter hole structure to a diameter or a width of each corresponding aperture is about 3:1 to about 30:1 or greater. Additionally, frontside illumination devices become a better option for manufacturing when a diverging optical element is included than without. This is equally favorable for in-display fingerprint image sensors because of the overall thickness reduction. In one embodiment, a light absorbing material is provided (e.g., coated on) to cover the sidewalls of the collimator filter hole structures.

Figure 7:
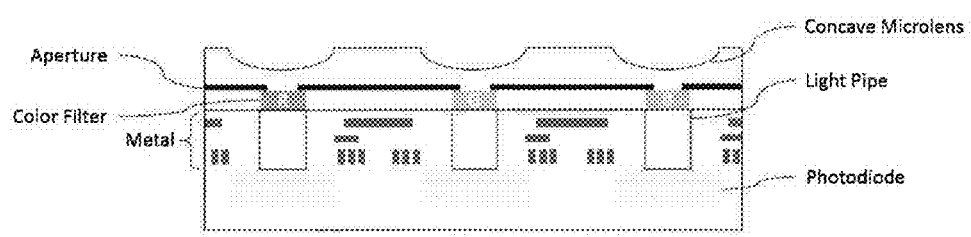
FIG. 7 illustrates an example of an optical sensor configured for frontside illumination according to an embodiment of the disclosure.
Figure 8:
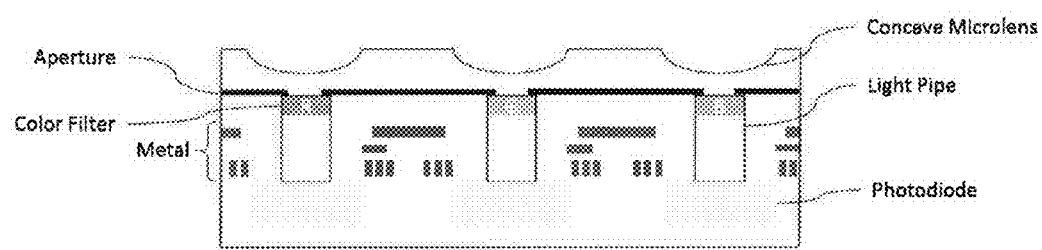
FIG. 8 illustrates another example of an optical sensor configured for frontside illumination according to an embodiment of the disclosure.
Figure 9:
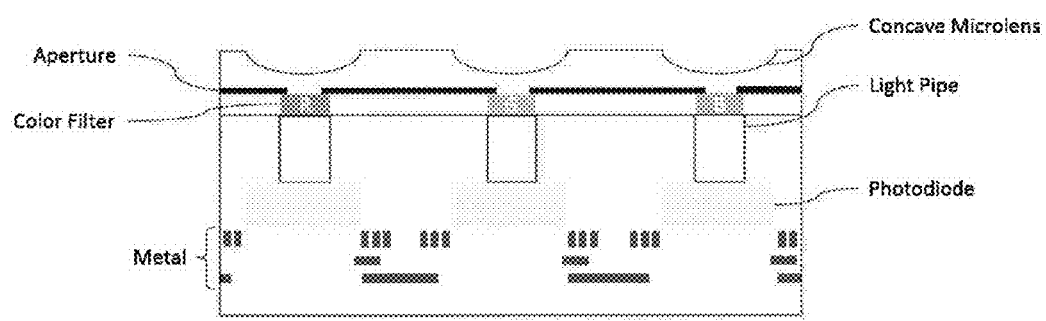
FIG. 9 illustrates an example of an optical sensor configured for backside illumination according to an embodiment of the disclosure.
Figure 10:
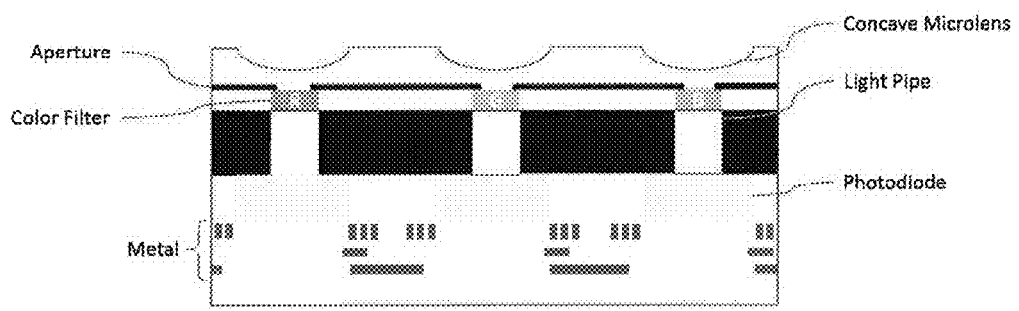
FIG. 10 illustrates another example of an optical sensor configured for backside illumination according to an embodiment of the disclosure.
Figure 11:
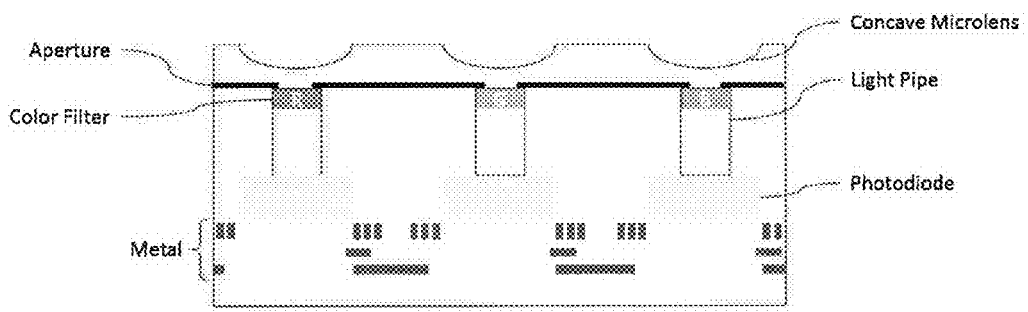
FIG. 11 illustrates another example of an optical sensor configured for backside illumination according to an embodiment of the disclosure.

FIG. 7 and FIG. 8 illustrate example embodiments of frontside illuminated devices according to various embodiments. FIGS. 9-11 illustrate example embodiments of backside illuminated devices according to various embodiments. In these backside illuminated embodiments, the array of apertures is disposed on a back side of a semiconductor die or wafer within which the array of light sensing elements is formed. Also, the array of collimator filter hole structures is formed in the backside of the semiconductor die or wafer. FIG. 10 illustrates the manufacturing option that the light pipe layer can be created with an additive step using, e.g., Black Matrix (BM) Resin. In one embodiment, the light conditioning layer 204 is an opaque layer with array of holes or light pipes 220. The light pipes 220 are formed using any suitable technique, such as laser drilling, etching and the like. As shown in FIG. 7 and FIG. 9, in one embodiment, the color filter layer can be constructed as a separate layer disposed between the aperture layer 260 and the collimator filter hole structure layer 220. As shown in FIG. 8 and FIG. 11, in one embodiment, the color filter layer can be created or formed in the light pipe or collimator filter hole structure.

The light sensing element pitch (distance between elements) may be smaller than the aperture 262 pitch (distance between apertures), for example, in some embodiments where the image sensor array 202 is a CCD or CMOS image sensor, and the light passing through a single aperture 262 or collimator filter hole structure 220 may illuminate more than one light sensing element. An example of such an arrangement for embodiments including an array of collimator filter hole structures 220 is shown by optical sensing elements 232 and 234 in FIG. 4 and FIG. 6. In such cases, the processing system (FIG. 1) may combine the light intensity recorded by all the optical sensing elements corresponding to a given collimator filter hole structure. The resulting fingerprint image after processing raw data from the image sensor array 202 may have a resolution corresponding to the array of apertures 262 for embodiments where no collimator filter holes structures 220 are present, or a resolution corresponding to the array of collimator filter hole structures 220. It will be noted that the arrangement of apertures 262 or collimator filter hole structures 220 in the light conditioning layer 204 may result in some optical sensing elements in the sensor array 202 going unused. Examples of unused optical sensing elements are sensing elements 236 in FIG. 4 and FIG. 6. Because optical sensing elements 236 are not underneath a collimator hole (or aperture), reflected rays will be blocked before reaching them. Image processing may remove the unused sensor elements and scale the image appropriately before the data is used in image reconstruction or image matching, for example.

The imaging resolution (in dpi) of the optical sensor 200 is defined by the resolution of the apertures 262 (or the aperture-collimator filter hole structure combination) in the light conditioning layer 204 whereas the pitch is the distance between each aperture. In the optical sensor 200, each aperture 262 in the light conditioning layer 204 corresponds to a sample of a feature of the object 216 being imaged, such as a sample from a ridge or valley within a fingerprint. To maximize resolution, the sampling density (which is equal to the aperture density) should be large enough such that multiple samples are taken of each feature of interest. Thus, for example, to image ridges in a fingerprint, the pitch may be on the order of 50 to 100 microns since the pitch of the ridges themselves is on the order of 150 to 250 microns. If it desired to capture more granular features, such as pores in a fingerprint, a smaller pitch such as 25 microns would be appropriate. Conversely, a larger pitch can be used to capture larger features of the input object.

The optical sensor 200 performs similarly over a wide range of distances between the light conditioning layer 204 and the sensing surface 220 because the filtering of reflected light is generally thickness independent, as long as the aspect ratio of any collimator filter hole structures in the light conditioning layer 204 is chosen to support the desired optical resolution.

Figure 12:
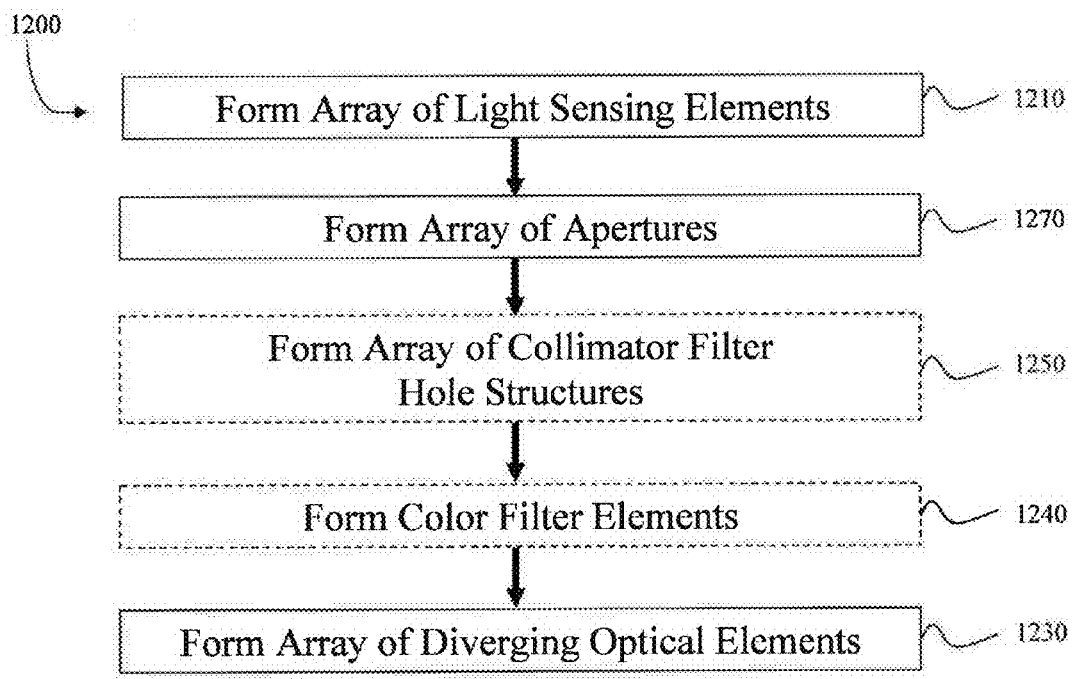
FIG. 12 illustrates an example of a process for making an optical biometric sensor according to an embodiment of the disclosure

FIG. 12 illustrates a process for making an optical biometric sensor according to an embodiment. In step 1210, an array of light sensing elements is formed in a substrate (e.g., wafer, which may later be singulated to form individual sensor dies). In step 1220, an array of apertures is formed on the substrate. In step 1230, an array of diverging optical elements is formed on the array of apertures, such that the array of apertures is disposed between the array of light sensing elements and the array of diverging optical elements. The array of diverging optical elements is arranged such that light incident on the diverging optical elements within a limited acceptance angle passes through the apertures and towards the light sensing elements and such that light incident on the diverging optical elements outside of the limited acceptance angle diverges away from the apertures.

In one embodiment, optional step 1250 includes forming an array of collimator filter hole structures. In an embodiment, the collimator filter hole structures are formed such that each aperture is disposed proximal to a light entry end of a corresponding collimator filter hole structure, and each collimator filter hole structure extends from the corresponding aperture toward at least one corresponding light sensing element. In another embodiment, the collimator filter hole structures are formed such that the array of apertures is disposed on a back side of a semiconductor wafer or die comprising the substrate within which the array of light sensing elements is formed, and the array of collimator filter hole structures is formed in the backside of the semiconductor wafer or die. In another embodiment, the collimator filter hole structures are formed such that each aperture forms a light entry end of a corresponding collimator filter hole structure, and each collimator filter hole structure extends from the corresponding aperture toward at least one corresponding light sensing element. In another embodiment, the collimator filter hole structures are formed such that each aperture is disposed proximal to a light exit end of a corresponding collimator filter hole structure, and each collimator filter hole structure extends from the corresponding aperture toward at least one corresponding diverging optical element disposed at a light entry end of the collimator filter hole structure. In this embodiment, each collimator filter hole structure may include an optically clear material, and wherein the at least one corresponding diverging optical element forms the light entry end of the collimator filter hole structure.

In one embodiment, optional step 1240 includes forming an array of optical color filter elements between the array of apertures and the array of light sensing elements. The color filter elements may be formed as part of the step 1250 of forming the collimator filter hole structures to form the color filter elements in the collimator filter hole structures (see, e.g., FIG. 8 and FIG. 11) or step 1240 may be separately performed to form a separate layer of color filter elements.

Co-pending U.S. application Ser. No. [Leydig reference 722897 (150117US)], entitled "Image Sensor Structures for Fingerprint Sensing," and filed concurrently herewith, provides various details for forming optical biometric sensor devices, including forming collimator filter hole structures, and is hereby incorporated by reference in its entirety.

Although this disclosure describes optical object imaging in the context of fingerprint image sensing, the method and system may be used to image any biometric object (object having biometric features). For example, a high resolution image of a palm or hand may be acquired by placing the hand directly on the cover layer. Imaging of non-biometric objects is also with the scope of this disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An optical biometric sensor, comprising:
    an array of light sensing elements;
    an array of diverging optical elements; and
    an array of apertures in an opaque material layer disposed between the array of light sensing elements and the array of diverging optical elements, each aperture in the array of apertures being disposed between a corresponding one of said diverging optical elements and at least one corresponding light sensing element in the array of light sensing elements;
    wherein light incident on the diverging optical elements within a limited acceptance angle passes through the corresponding apertures and towards the at least one corresponding light sensing element and wherein light incident on the diverging optical elements that is outside of the limited acceptance angle diverges away from the corresponding apertures and towards the opaque material layer.

2. The optical biometric sensor of claim 1, wherein the array of diverging optical elements includes a plurality of lens elements formed of a second material having a second index of refraction, $n_2$, different than a first index of refraction, $n_1$, of a first material from which the light incident on the diverging optical elements enters the diverging optical elements.

3. The optical biometric sensor of claim 1, wherein the array of apertures has a pitch less than a pitch of ridges in a fingerprint.

4. The optical biometric sensor of claim 1, further including an array of optical color filter elements disposed between the array of apertures and the array of light sensing elements.

5. The optical biometric sensor of claim 1, further including an array of collimator filter hole structures, wherein each aperture is disposed proximal to a light entry end of a corresponding collimator filter hole structure, and wherein each collimator filter hole structure extends from the corresponding aperture toward the at least one corresponding light sensing element.

6. The optical biometric sensor of claim 5, wherein a diameter or a width of each collimator filter hole structure decreases from the light entry end to a distal end proximal the at least one corresponding light sensing element.

7. The optical biometric sensor of claim 5, wherein the array of apertures is disposed on a back side of a semiconductor die within which the array of light sensing elements is formed, and wherein the array of collimator filter hole structures is formed in the backside of the semiconductor die.

8. The optical biometric sensor of claim 1, further including an array of collimator filter hole structures, wherein each aperture forms a light entry end of a corresponding collimator filter hole structure, and wherein each collimator filter hole structure extends from the corresponding aperture toward the at least one corresponding light sensing element.

9. The optical biometric sensor of claim 1, further including an array of collimator filter hole structures, wherein each aperture is disposed proximal to a light exit end of a corresponding collimator filter hole structure, and wherein each collimator filter hole structure extends from the corresponding aperture toward at least one corresponding diverging optical element disposed at a light entry end of the collimator filter hole structure.

10. The optical biometric sensor of claim 1, wherein the array of apertures is disposed on a back side of a semiconductor die within which the array of light sensing elements is formed.

11. The optical biometric sensor of claim 1, wherein the biometric sensor is a fingerprint sensor.

12. A method for making an optical biometric sensor, comprising:
    forming an array of light sensing elements in a substrate;
    forming an array of apertures in an opaque material layer on the substrate;
    forming an array of diverging optical elements on the array of apertures, wherein the array of apertures is disposed between the array of light sensing elements and the array of diverging optical elements, each aperture in the array of apertures being disposed between a corresponding one of said diverging optical elements and at least one corresponding light sensing element in the array of light sensing elements,
    wherein the array of diverging optical elements is arranged such that light incident on the diverging optical elements within a limited acceptance angle passes through the corresponding apertures and towards the at least one corresponding light sensing element and such that light incident on the diverging optical elements outside of the limited acceptance angle diverges away from the corresponding apertures and towards the opaque material layer.

13. The method of claim 12, further comprising forming an array of optical color filter elements between the array of apertures and the array of light sensing elements.

14. The method of claim 12, further comprising forming an array of collimator filter hole structures.

15. The method of claim 14, wherein the array of apertures is disposed on a back side of a semiconductor die comprising the substrate within which the array of light sensing elements is formed, and wherein the array of collimator filter hole structures is formed in the backside of the semiconductor die.

16. The method of claim 14, wherein each aperture is disposed proximal to a light exit end of a corresponding collimator filter hole structure, and wherein each collimator filter hole structure extends from the corresponding aperture toward at least one corresponding diverging optical element disposed at a light entry end of the collimator filter hole structure.

17. The method of claim 12, wherein the array of apertures is disposed on a back side of a semiconductor die comprising the substrate within which the array of light sensing elements is formed.

18. An input device for imaging a biometric object, comprising:
an input surface;
an optical image sensor for sensing a biometric object at the input surface; and
a display cover lens positioned between the optical image sensor and the input surface;
wherein the optical image sensor comprises:
an array of light sensing elements;
an array of diverging optical elements; and
an array of apertures in an opaque material layer disposed between the array of light sensing elements and the array of diverging optical elements, each aperture in the array of apertures being disposed between a corresponding one of said diverging optical elements and at least one corresponding light sensing element in the array of light sensing elements,
wherein light incident on the diverging optical elements from the input surface within a limited acceptance angle passes through the corresponding apertures and towards the at least one corresponding light sensing element and wherein light incident on the diverging optical elements from the input surface outside of the limited acceptance angle diverges away from the corresponding apertures towards the opaque material layer.

19. The input device of claim 18, wherein a surface of the display cover lens comprises the input surface.

20. The input device of claim 18, wherein the input surface comprises a surface of an optically transparent glass or polymer material layer overlaying the display cover lens.

21. The input device of claim 18, wherein the array of apertures has a pitch less than a pitch of ridges in a fingerprint.

22. The input device of claim 18, further including an array of collimator filter hole structures, wherein each aperture defines a light entry end of a corresponding collimator filter hole structure, and wherein each collimator filter hole structure extends from the corresponding aperture toward the at least one corresponding light sensing element.

23. The input device of claim 22, wherein a diameter or a width of each collimator filter hole structure decreases from the light entry end to a distal end proximal the at least one corresponding light sensing element.

* * * * *